United States Patent [19]
Regnault et al.

[11] Patent Number: 5,184,329
[45] Date of Patent: Feb. 2, 1993

[54] METHOD AND DEVICE FOR OPTIMIZING THE TRIGGERING OF AN ARRAY OF MARINE SEISMIC SOURCES

[75] Inventors: Alain Regnault, Antony; Jacques Cretin, le Chesnay; Pascal Froidevaux, Paris, all of France

[73] Assignees: Institut Francais de Petrole, Rueil-Malmaison; Compagnie Generale de Geophysique, Massy, both of France

[21] Appl. No.: 723,391

[22] Filed: Jun. 28, 1991

[30] Foreign Application Priority Data

Jun. 29, 1990 [FR] France .................. 90 08267

[51] Int. Cl.$^5$ .................. G01V 1/38; H04R 1/02
[52] U.S. Cl. .................. 367/23; 367/26; 181/110; 181/111; 364/421; 364/151
[58] Field of Search .................. 367/23, 26; 181/110, 181/111, 120; 364/806, 924.5, 421, 151

[56] References Cited

U.S. PATENT DOCUMENTS

| | | | |
|---|---|---|---|
| 3,602,878 | 8/1971 | Sullivan | 367/23 |
| 3,855,456 | 12/1974 | Summers et al. | 364/571.04 |
| 3,900,824 | 8/1975 | Trouiller et al. | 367/23 |
| 3,985,199 | 10/1976 | Baird | 181/107 |
| 4,144,578 | 3/1979 | Mueller et al. | 364/571.05 |
| 4,210,965 | 7/1980 | Ingram | 367/26 |
| 4,240,518 | 12/1980 | Chelminski | 181/107 |
| 4,300,653 | 11/1981 | Cao et al. | 181/107 |
| 4,349,896 | 9/1982 | Hall | 367/26 |
| 4,508,191 | 4/1985 | Manin . | |
| 4,712,198 | 12/1987 | Fail . | |
| 4,739,858 | 4/1988 | Dragoset et al. | 181/115 |
| 4,757,482 | 7/1988 | Fiske | 367/144 |
| 4,800,538 | 1/1989 | Passmore et al. | 367/23 |
| 4,960,183 | 10/1990 | Young | 181/103 |
| 5,014,229 | 5/1991 | Mofachern | 364/571.04 |

FOREIGN PATENT DOCUMENTS 0161635 10/1982 Japan .................. 364/571.04

Primary Examiner—Nelson Moskowitz
Attorney, Agent, or Firm—Antonelli, Terry, Stout & Kraus

[57] ABSTRACT

Each source of an array of seismic signal sources is associated with one or several sensors (Ci) which pick up the impulses the associated source emits at the time of triggering. The device essentially includes an apparatus (6) for the acquisition and the storage of all the signals emitted by the sensors (Ci) and a shooting control apparatus (7), having memories for reference data, for triggering the seismic sources according to these reference data. A computer (10) is programmed to determine the reference data used for the triggering, preferable according to the signals from the sensors (Ci) acquired during the previous emission cycles and validated in order to check whether their form and/or arrival times are within fixed limits. This arrangement makes it possible to take into account the real working conditions of the emission array. The invention can be utilized in marine seismic prospecting.

9 Claims, 4 Drawing Sheets

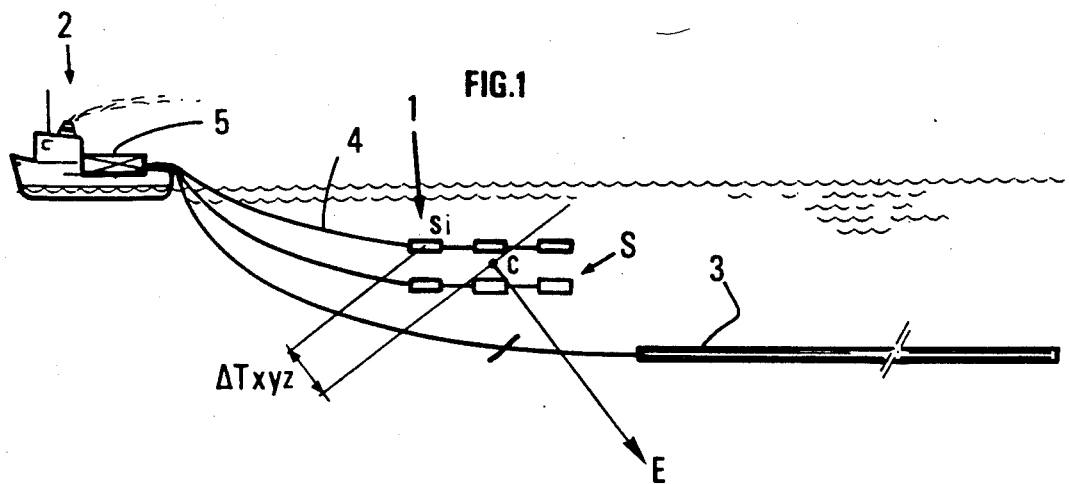
FIG.1
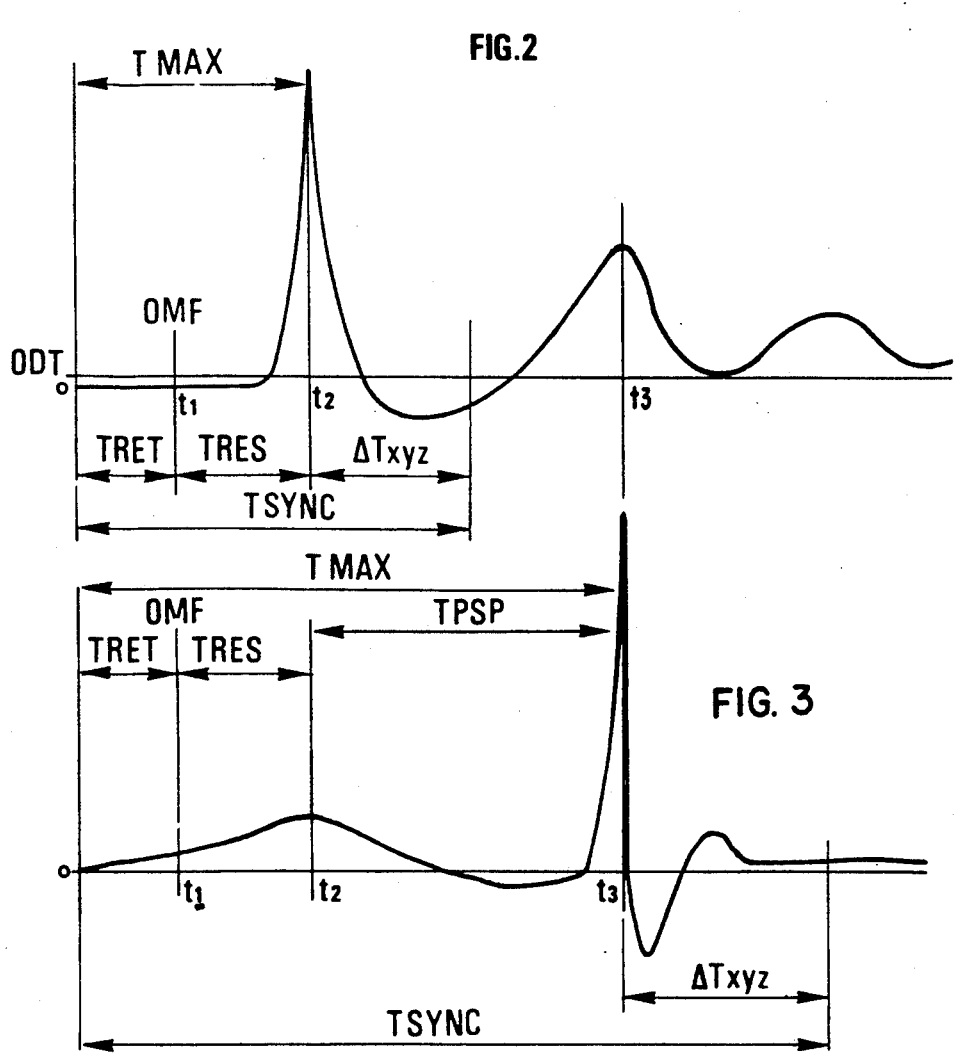
FIG.2
FIG. 3

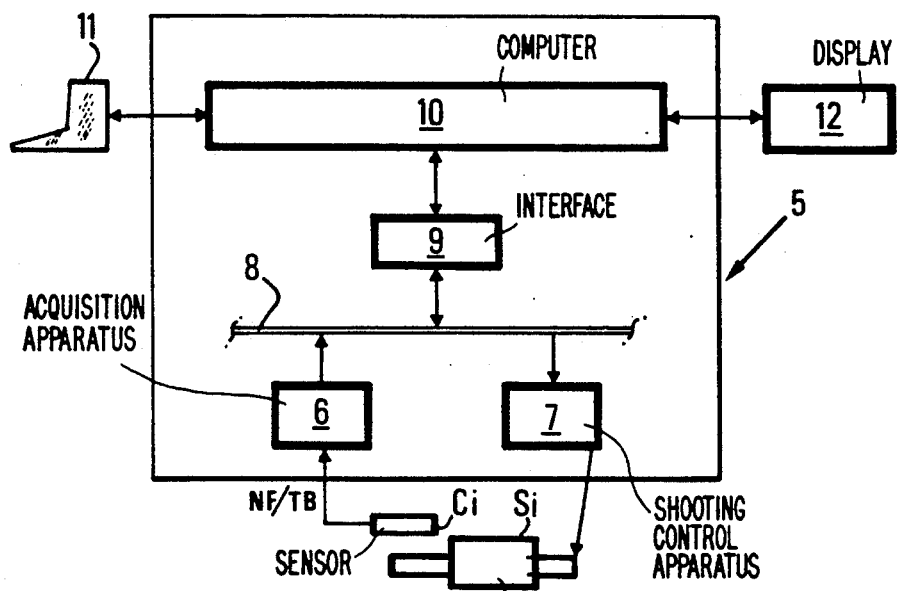
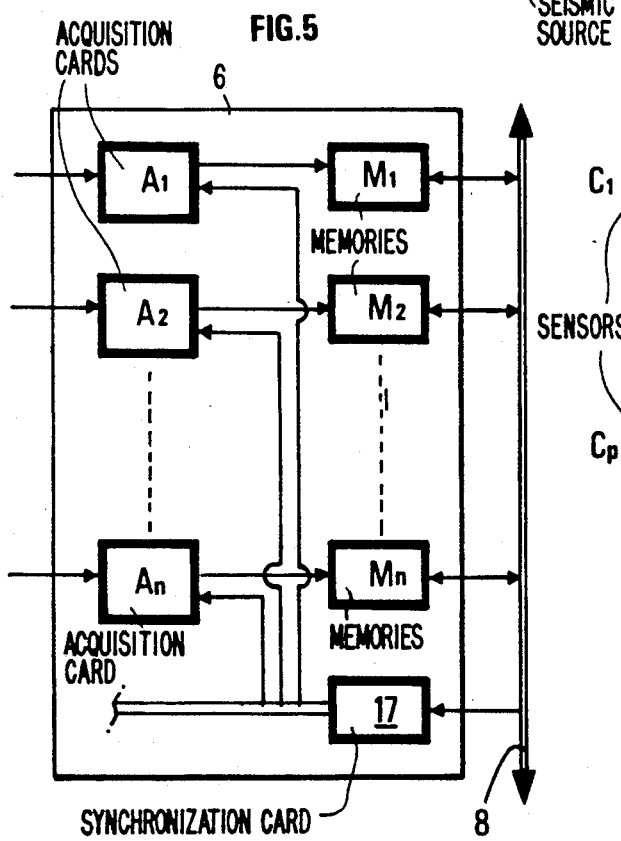
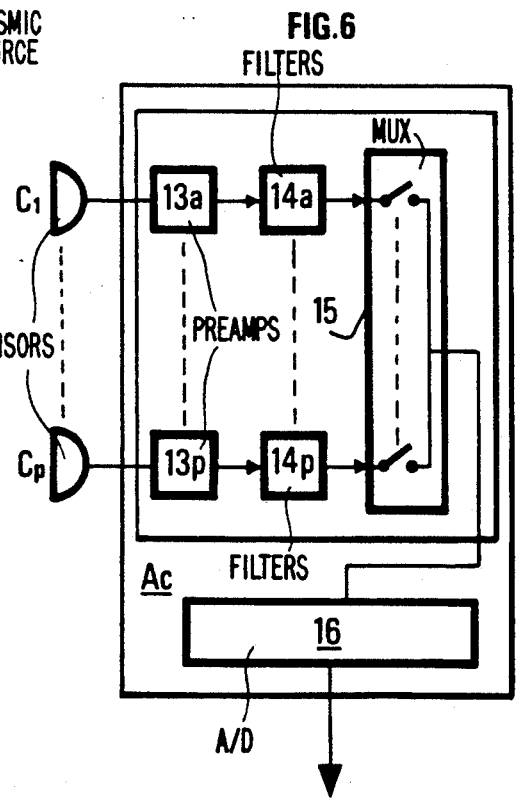

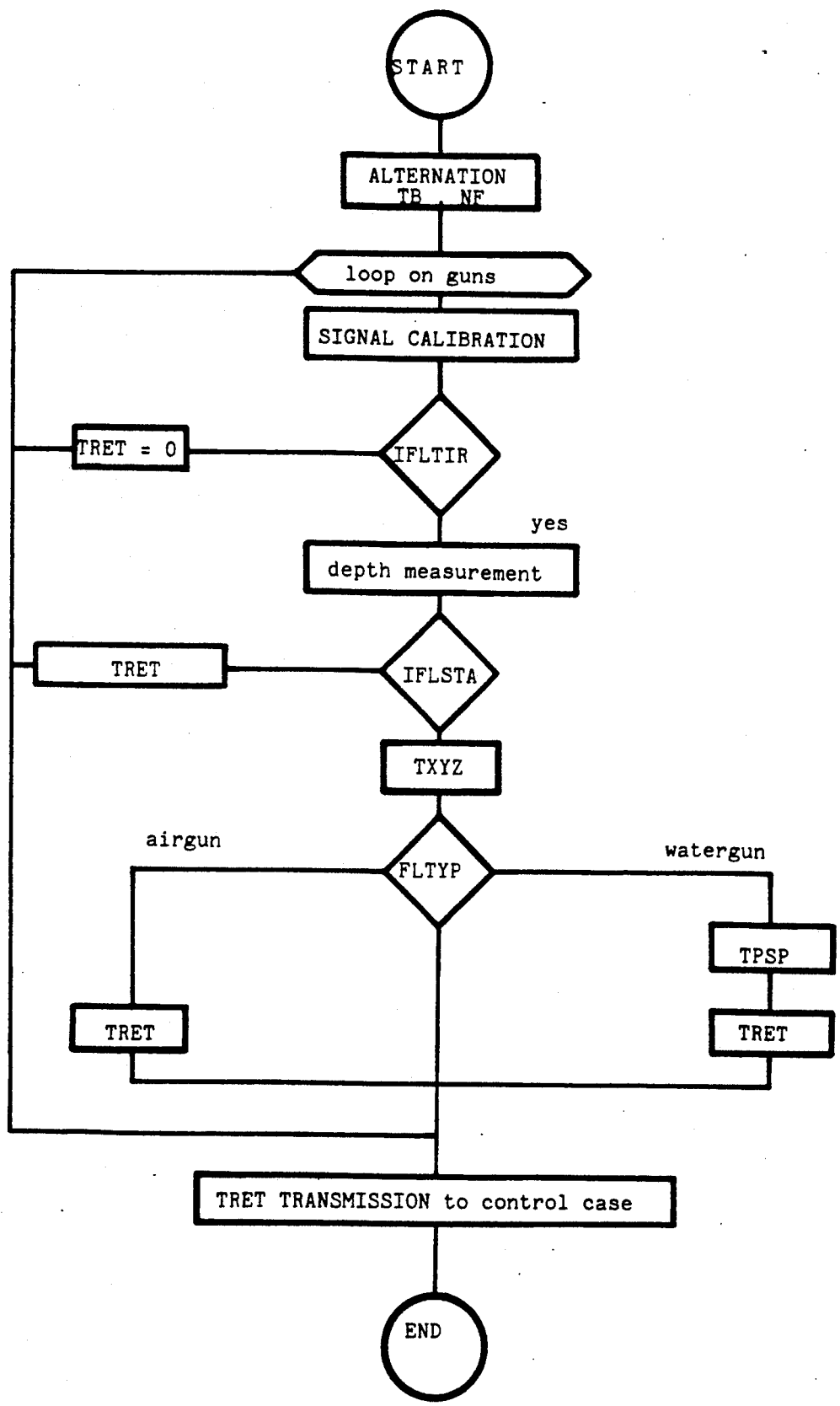

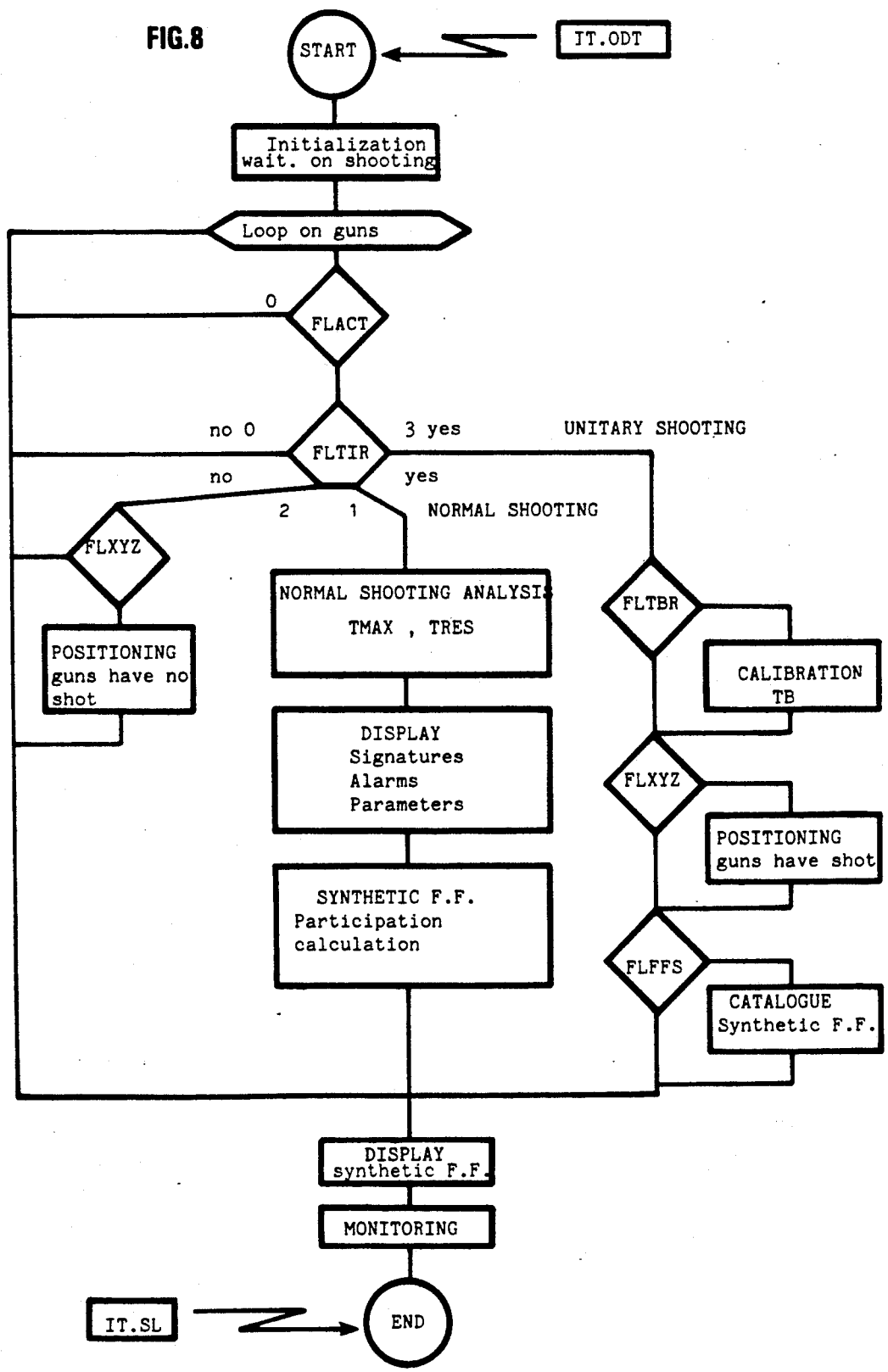

METHOD AND DEVICE FOR OPTIMIZING THE TRIGGERING OF AN ARRAY OF MARINE SEISMIC SOURCES

BACKGROUND OF THE INVENTION

The object of the present invention is to provide a method for optimizing the triggering of an array of marine seismic sources and a shooting control device for implementing the method.

Conventional marine seismic prospecting methods are usually carried out by using a wave emission array and a wave reception array towed by a ship along a seismic profiling plane which is to be studied. The waves generated by the emission array are reflected by different reflectors of immersed formations and are received by the reception array, which generally consists of a seismic streamer of great length along which a large number of sensors are arranged.

The emission array consist of a source, and more commonly, of a plurality of sources towed while immersed and connected with the ship by groups of multi-function cables or umbilicals. Impulse sources are used most often. The form of the produced wave depends on the type of source. If the sources are of the explosion type, such as airguns for example, the main peak is produced first. With sources of the implosion type such as waterguns, the main peak is preceded by a precursory peak with a lower amplitude.

These sources are immersed, as the case may be, at substantially equal depths or systematically at different depths. The triggering times are selected with precision in view of the particular layout chosen for the emission array in order to obtain a powerful and directional source. It is a matter of obtaining, by selecting the triggering times of the different sources, the phasing of their main respective peaks in a certain direction. The operation is generally complex because multiple parameters have to be taken into account. According to the type of source, its depth of use and its mechanical state after the number of "shootings" it has performed previously, the effective time when the main peak of the source occurs may vary within notable proportions.

A shooting sequencer, adapted to take into account the different parameters characterizing the emission array used, is generally utilized to obtain the desired phasing. Sensors are located close to the sources to determine the triggering times and/or the form of the produced impulses.

Systems where sequencers are used for controlling impulse sources are described, for example, in U.S. Pat. Nos. 4,599,712, 4,693,336, 4,718,045, 4,739,858 and in European Patent Applications Nos. 31,196 and 48,623.

The large number of parameters likely to influence the triggering delay of each one of the sources of the array makes the desired phasing of the main peaks very complex. In a general way, the devices providing the sequencing of a multi-source emission array only take into account a limited number of parameters, such as the structural triggering delay, the depth of immersion, etc., and do not take into account the fluctuations of these parameters in the real operating conditions at sea.

SUMMARY OF THE INVENTION

The method according to the present invention makes it possible to better take into account the different parameters influencing the effective triggering delays of the different impulse sources of a seismic emission array and to avoid the causes of imprecision resulting form the prior systems.

The invention applies to a seismic prospecting system achieving a succession of emission-reception cycles along a profile to be studied by means of an array of immersed impulse sources towed by a ship and connected with a shooting control device adapted for managing the triggering sequences of the sources and allows obtaining of the phasing of the impulses emitted by the different sources.

The method according to the invention comprises in combination:
  acquiring, for each one of the sources of the emission array, at least one signal representative of the impulse produced by that source,
  validating the signal acquired for each source, by comparison with a reference signal associated with the same source, taken from a data table acquired previously and concerning all the sources used, in order to select those showing a sufficient degree of similarity,
  updating the data of the table by incorporating the validated signals, to take into account the modifications which have occurred in the emission array during previous emission-reception cycles,
  determining the optimal triggering times of the different sources while taking into account the updated data, and
  triggering the different sources at the determined optimal triggering times.

The validation operation comprises, for example, comparing the respective frequency spectra of each acquired signal and of the corresponding reference signal.

The validation operation may also comprise comparing, at time of intervals, the respective energy levels of each acquired signal and of the corresponding reference signal.

The method may also comprise determining the effective triggering time of each source, updating a second data table respectively representative of the effective response times of the different sources, and adjusting the triggering times according to the data from the second table after its updating.

Determining the triggering time of each source is preferably performed by correlating each validated signal and the corresponding reference signal.

Determining of the triggering time of each source can also be achieved by comparing the amplitude of each validated signal with a set threshold value.

The method can also comprise storing at defined time intervals, corresponding to a certain number of emission-reception cycles, at least one datum representative of the impulse emitted by each source and comparing the successive data associated with each impulse in order to ascertain its working condition over time.

The shooting control device according to the invention allows optimizing of the triggering of a seismic emission array comprising a plurality of impulse sources towed by a ship, in order to obtain an optimum phase relationship between them, each source being associated with at least one control sensor delivering a signal representative of the impulse emitted by the source as it is triggered. The shooting control device comprises:
  an acquisition apparatus connected with the different sensors to collect the signals which they produce at each shooting and to digitize and store them, a shooting control apparatus to control the triggering of the sources, this apparatus being fitted with at least one storage unit for reference data obtained during prior shooting sequences, and a programmable computer fitted with storage means for at least one reference data table, the computer communicating with the acquisition apparatus and the shooting control apparatus and determining the optimal triggering times of the different sources while taking into account the stored data, and transferring into the storage unit of the control apparatus before the triggering of the different sources the effective values of the triggering delays that are to be applied to them respectively.

The acquisition apparatus comprises, for example, at least one acquisition array consisting of a plurality of amplification and filtering chains connected by multiplexing means, storage means for the digitized signals from each acquisition array, the acquisition apparatus and the shooting control apparatus communicating with the computer through an address and data bus.

The storage means of the computer comprise, for example, a storage unit for a first reference data table representative of signals respectively received by the sensors associated with the different sources and validated, and for a second reference data table representative of the triggering times associated with the validated reference signals.

The reference that is made before each shooting to data representative of the real conditions of the prior emission sequence makes it possible to guarantee constant adaptation to the possible changes in the working condition of the emission array.

BRIEF DESCRIPTION OF THE DRAWINGS

Other features and advantages of the method and the device according to the invention will be clear from reading the description hereafter of an embodiment given by way of non-limitative example, with reference to the accompanying drawings in which:

FIG. 1 diagrammatically shows an emission-reception array for marine seismic prospecting;

FIG. 2 shows the approximate form of an impulse sent out at the emission array by a seismic source of the explosive type such as an airgun;

FIG. 3 shows the approximate form of a corresponding impulse emitted by an implosive source of the watergun type;

FIG. 4 diagrammatically shows the control device according to the invention;

FIG. 5 diagrammatically shows the signal acquisition apparatus;

FIG. 6 diagrammatically shows a signal acquisition unit;

FIG. 7 shows the flow chart of each preparatory sequence; and

FIG. 8 shows the shooting analysis flow chart including the check and calculation stage performed by the computer

DESCRIPTION OF THE PREFERRED EMBODIMENTS

A marine seismic emission-reception system, such as that diagrammatically shown in FIG. 1, comprises an impulse emission array 1 towed in immersion by a ship 2, as well as a reception array consisting of a seismic streamer 3 of great length. Emission array 1 generally comprises a number P of sources $Si$ ($i = 1, 2 \ldots P$) distributed into several sub-arrays, each one consisting of several sources located along a harness of multifunction cables or umbilicals 4. The sub-arrays are towed at the same depth with different lateral offsets in relation to the towing ship and/or, as the case may be, at different depths. Each source $Si$ is more or less off-centered.

Each source receives a triggering signal from a control system 5 on the ship through transmission lines in the umbilical cable 4 that connects the source with the ship. In return, control system 5 receives, from a kinematic sensor integrated in each source, a triggering signal TB defining the exact triggering time. An acoustic sensor located in close proximity to each source (one meter for example) or, as the case may be, to each group of sources when several of them are grouped together, produces a proximity signal NF or "signature", which is also transmitted to the control system 5. The same sensor is also used between the shootings to measure the depth of immersion of each source. The signals TB are a few milliseconds earlier than the corresponding signals NF.

An initial time ODT defines the beginning of each "shooting" sequence (FIG. 2, 3). The following different significant time intervals are defined in relation to this initial time:

Tsync : is the time when the main peaks of the different sources of the emission array must be in phase in a selected emission direction E (FIG. 1);

TMAXi : is the time when the main peak of source SI is detected by the associated close sensor;

TRETi : is the delay time before a triggering or a firing order (OMF) is sent to source Si;

TRESi : is the response time of source Si calculated at the time of the previous "shooting" of the emission array.

This time is determined at the first inflow of energy coming from the source. It depends on the mechanical and/or hydraulic structure of the source.

ΔTXYZi is the static correction (FIG. 1) which takes into account the geometric shift of the position of source Si in relation to the center of emission device 1, considering the emission direction E.

TPSPi is the pseudo-period (for implosion sources) of source Si. The pseudo-period of each implosive source is calculated from Raleigh's law, well-known in the seismic field, according to the hydrostatic pressure at the real depth of immersion Zi of the source.

TRETi must be used to modify the time of peak TMAXi of each source Si. Parameters TRESi, ΔTXYZi and TPSPi are only known with precision through measurements carried out during each emission-reception cycle.

After its triggering has been ordered with the delay time TRET (time t1), an explosive source (FIG. 2) produces its main peak (time t2) which is followed by a secondary peak with a lower amplitude (time t3).

The main peak of a source Si of the implosion type (FIG. 3) is preceded at the instant t2 by a precursory peak. The gap (t3−t2) is the pseudo-period TPSP of the source.

The control system 5 according to the invention makes it possible to adapt very precisely the time intervals TRET and ΔTXYZ of each source to the effective working conditions of the emission array, in order to respect the optimal phase shifts of the different main peaks produced.

Control system 5 comprises (FIG. 4) an acquisition apparatus 6 receiving the signals TB and/or NF supplied by the sensors Ci associated with the sources S of the emission array. It also comprises a shooting control apparatus 7 for adapting the triggering signals transmitted to the solenoid valves of the different sources. The acquisition and control devices 6 and 7 communicate through an address and data bus 8 with an interface card 9, itself connected with a programmable computer 10. Interaction between the operators and computer 10 is achieved by means of a control desk 11 and a display unit 12.

Acquisition apparatus 6 (FIG. 5) comprises a certain number of acquisition cards A1, A2, ... An, each one for a certain number p of channels (p=32 for example). Each acquisition card comprises (FIG. 6) a preamplifier 13a ... 13p in series with a bandpass filter 14a ... 14p. The gain and the features of each filter 14 are adapted to the types of sensors C1 ... Cp that are used. The filtered signals are applied to a multiplexer 15 with p inputs whose output is connected with a digitization circuit 16. The signals digitized by each acquisition card A1 ... An are respectively stored in memory cards M1 to Mn. The computer can read them by means of interface card 9. All of the acquisition cards are monitored by means of a synchronization card 17 connected with bus 8 which manages the multiplexing, the digitizing and the transferring of digitized data towards the corresponding memory cards M1 to Mn.

The acquisition time and the sampling frequency are adapted depending on whether the sensors connected with the inputs of each acquisition card are signals TB or NF. Signals TB are, for example, acquired during a 0.3 s period at a sampling frequency of 10 kHz. The frequency is 5 kHz for signals NF, for example, and their sampling duration is 0.4 s.

The gun control apparatus preferable comprises two memory units of stacks where the computer lists before each triggering sequence numeric words which are representative of the triggering delays (TRET) it has calculated and which the control apparatus will have to apply respectively to the different sources to obtain the required phasing at the time TSYNC. Computer 10 comprises memory units or stacks (not shown) for a reference table T1 consisting of digital words representative of the form of the impulse emitted by each source of emission array 1. A second reference table T2 representative of the effective response times (TRES) of the different sources is also preferable stored in these memory stacks.

Each working cycle of the control system comprises a stage of emission from the emission array, a real time acquisition stage directly managed by the acquisition apparatus, and a measuring and checking stage. During this last stage, the computer authenticates the received signals TB or NF from the digitized data stored during the previous phase, by comparison with reference data, calculates the reception time and updates the data of reference tables T1 and T2 by including authenticated data, and uses the updated data to order the sequence of triggering of the following cycle, as described hereafter.

The data acquired at the end of any cycle N are used to modify the time OMF for each source (see FIG. 3) in order to compensate for the possible offsets in the phasing of the different sources.

When a shooting (N) has occurred, the acquisition cards A1 ... An of acquisition apparatus 6 receive and digitize all the signals TB and/or NF picked up close to the different sources Si and store them in memories M1 to Mn.

This acquisition stage being over, computer 10 reads memories M1 to Mn from its memories, the first table representative of the form of the impulses emitted by the different sources Si.

In a first stage, computer 10 conducts form recognition by comparing each signal NF with the corresponding data of the first table in order to check whether each received signal is really caused by the source. The possible cases where a source has not worked properly or has not worked at all, although a signal of parasitic origin has been received and stored, can be detected thereby. The similarity between each signal and the corresponding reference signal can be checked through several methods. Computer 10 can compare the frequency spectra of the signals, for example, or compare the R. M. S. values or the energy levels of the signals per period of time, etc.

If the degree of similarity is higher than a set threshold, the signal is validated and recorded in the first reference table T1 stored in control system 5.

In this case, computer 10 determines the time TMAXi where the main peak of each source Si occurs. This operation is performed by correlation between the reference signal and signal TB or NF of each source, for example, or by comparison with a threshold amplitude within a determined period of time. The shooting time calculated thereby is recorded in the second table T2 arranged in the memory of computer 10.

Computer 10 then calculates the modifications to be possibly brought to the times TRET for the following shooting, so that the main peaks are really synchronous with the selected time TSYNC. The time $TRES_N$ obtained during the cycle N for each source Si is calculated with the relationship:

$$TRES_N = TMAX_N - TRET_N - TPSP_N \qquad (1)$$

The interval $TRET_{N+1}$ for the following shooting $N+1$ is obtained with the relationship:

$$TRET_{N+1} = TSYNC - TRES_N - \Delta TXYZ_{N+1} - TPSP_{N+1} \qquad (2)$$

where $\Delta TXYZ_{N+1}$ represents the geometric correction linked with the possible change in the configuration of the emission array which may have happened between two successive shootings and $TPSP_{N+1}$ represents the new pseudoperiod of the sources resulting from a possible variation of its depth of immersion between two successive shootings.

The computer modifies the shooting sequence to take into account the new values calculated for the different TRET.

The real coordinates Xi and Yi of each source Si can be regularly measured during the towing and integrated each time in the calculation of each TXYZi. It is also possible to consider them to be sufficiently stable during each seismic recording stage and only to take into account before each shooting possible depth variations measured by the sensor providing the signal TB.

The data recorded in the two tables T1, T2 may replace the previous data or be used for correcting an average obtained over a certain number of previous shootings. The reference data are therefore constantly updated by taking into account the real working conditions of the emission array.

At the beginning of each series of seismic emission-reception cycles, in the absence of reference signals, the picked up signals can be included in the lists of reference signals without any previous analysis.

If the similarity of the acquired signals with the corresponding reference signal is inadequate, the signal is rejected. The operator can then order the display of this signal and, if its non-validation is due to a failure of the source, he may order its inhibition for the following shooting sequences.

Computer 10 may also comprise auxiliary memories for storing, after validation, the different signals produced by the sources at regular intervals of m shootings (every 100 or 1,000 shooting for example). The operator can thereby order the computer to establish comparisons between signals from the same source and its working condition can be followed over time.

The control device can also order unitary shootings where each source is triggered alone in order to determine separately the associated signals TB or NF and carry out calibrations.

The two flow charts of FIG. 7 and FIG. 8 summarize the checking and calculation operations performed by computer 10.

The abbreviations used in the flow chart of FIG. 7, relative to the operations preceding each shooting, and in the general chart of FIG. 8, including the analysis stage performed after each shooting, have the following meanings:

FLACT : given source in the emission array
    0 : inactive-1 : active
FLTBR : sensor TB
    calibration
    0 : not done
    1 : requested
    2 : check
    3 : done
FLXYZ : position calculation
    0 : not positioned
    1 : requested
    2 : positioned
FLSTA : operating mode
    0 : manual
    1 : automatic requested
    2 : automatic
FLTIR : shooting
    0 : inhibited
    1 : authorized
    2 : inhibited; unitary shooting
    3 : authorized; unitary shooting
FLTYP : type of gun
    1 : implosive
    2 : explosive
FLFFS : setting up of the synthetic F. F. catalogue file
    1 : catalogue
    2 : participation in the FFS calculation
TRETD, TRETM, TRETE : given shooting delay, measured shooting delay, gap
Synthetic F.F. : stage of determination of the signature of the far field emission array.

Setting up other tables in order to store the status over time of other parameters such as, for example, the ΔTXYZ for each source of the emission array could be done without departing from the scope of the invention.

We claim:

1. A method of optimizing the triggering of each seismic source within an array of marine seismic sources being towed in immersion by a ship and under control of a shooting control system to manage the triggering times of the seismic sources in order to obtain determined phase shifts between the impulses respectively emitted by the different seismic sources while updating the triggering time shifts to be applied to the different seismic sources to take into account the alteration over time of the working conditions of each seismic source, said method comprising the steps of:

acquiring and digitizing during a determined time interval at least one signal picked up close to each one of the seismic sources due to its triggering, and storing each digitized signal, comparing for each seismic source the form of each stored signal, including at least one of the frequency spectra of the stored signal, the R. M. S. value of the stored signal, and the energy level of the stored signal per period of time, with a reference signal associated with the respective seismic source as stored in a first table of previously acquired data relating to the seismic sources, to ascertain whether said seismic source has worked properly;

validating the stored signals of those seismic sources ascertained to have worked properly;

updating the reference signals stored in the first table by incorporating the validated signals therein;

determining the optimum triggering times of the different seismic sources in accordance with the updated reference signals; and triggering the different seismic sources at the determined optimum triggering times.

2. A method as claimed in claim 1 further comprising determining the effective triggering time of each seismic source through an analysis by analyzing each validated signal, updating a second table containing data representative of the effective response times of the respective different sources with the corresponding data obtained by said analysis, and adjusting the triggering times in accordance with the data stored in the second table after updating thereof.

3. A method as claimed in claim 2 wherein the step of determining the optimum triggering time of each seismic source includes performing a correlation between each validated signal and the corresponding reference signal.

4. A method as claimed in claim 2 wherein the step of determining the optimum triggering time of each seismic source includes comparing the amplitude of each validated signal with a determined threshold value.

5. A method as claimed in any one of the previous claims, further comprising measuring variations in the geometry and relative position of each seismic source, and modifying the respective triggering times in accordance with the measured variations to maintain a predetermined phase relationship in the seismic signals.

6. A method as claimed in claim 4, further comprising storing, at defined time intervals corresponding to a certain number of emission-reception cycles of the array, at least a portion of the seismic signals picked up close to each seismic source, and comparing successive signals to analyze evolution in the condition of each seismic source.

7. A shooting control device for sequentially triggering a plurality of impulse generating seismic sources of a seismic emission array towed by a ship to maintain a predetermined phase relationship between seismic signals from the plurality of seismic sources, said device comprising:
- at least one control sensor associated with each seismic source for providing a signal representative of the impulse emitted by the associated seismic source;
- an acquisition apparatus, connected to the control sensors, for collecting at least a portion of the signals produced by the control sensors when the seismic sources are triggered, and for digitizing the collected signals and storing the digitized signals;
- programmable processing means connected to the acquisition apparatus and including storage means for storing at least a first table of reference signals, means for comparing, for the digitized signals stored by the acquisition apparatus, at least one of the frequency spectra of the stored digitized signals, the R. M. S. values of the stored digitized signals, and the energy levels of the stored digitized signals per period of time with the reference signals in the first table, means responsive to the comparison for determining and validating the stored digitized signals of properly working seismic signal sources, means for updating the first table with the validated signals, and means for computing the triggering times of the seismic sources on the basis of the updated first table.

8. A device as claimed in claim 7 wherein the acquisition apparatus comprises at least one acquisition assembly including a plurality of amplification circuits and a plurality of filtering circuits, digitizing means, multiplexing means connecting the filtering circuits with the digitizing means, storage means for storing the digitized signals from each acquisition, assembly, and an address and data bus for connecting the acquisition apparatus with the computing means.

9. A device as claimed in claim 7 or 8 wherein the storage means comprises memory means for storing as the first table data representative of the validated signals received respectively by the control sensors associated with the different sources, and second memory means for storing as a second table data representative of the computed triggering times.

* * * * *